T. MIDGLEY & E. HOPKINSON.
WHEEL TIRE.
APPLICATION FILED NOV. 21, 1906.

908,475.

Patented Jan. 5, 1909.

3 SHEETS—SHEET 1.

Witnesses
Raphaël Netter
Baxter Morton

Inventors:
Ernest Hopkinson
Thomas Midgley
By Ernest Hopkinson
Atty

T. MIDGLEY & E. HOPKINSON.
WHEEL TIRE.
APPLICATION FILED NOV. 21, 1906.
908,475.
Patented Jan. 5, 1909.
3 SHEETS—SHEET 2.
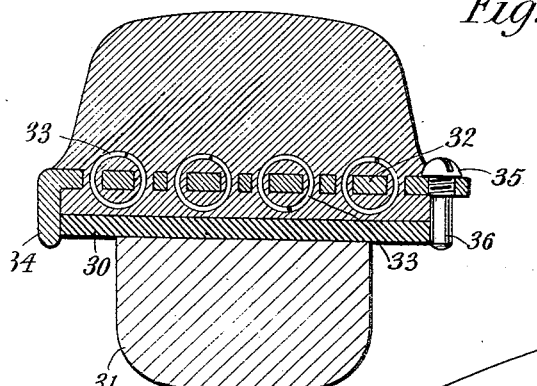
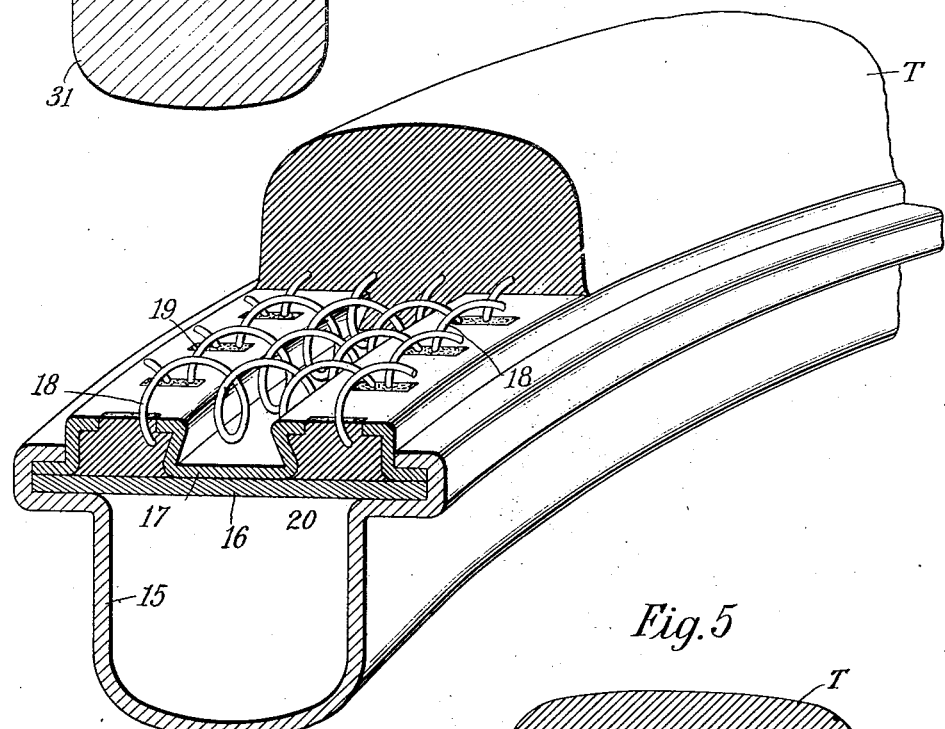
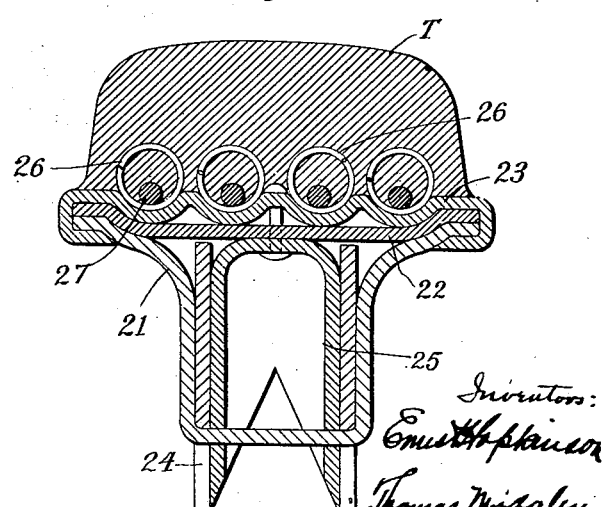

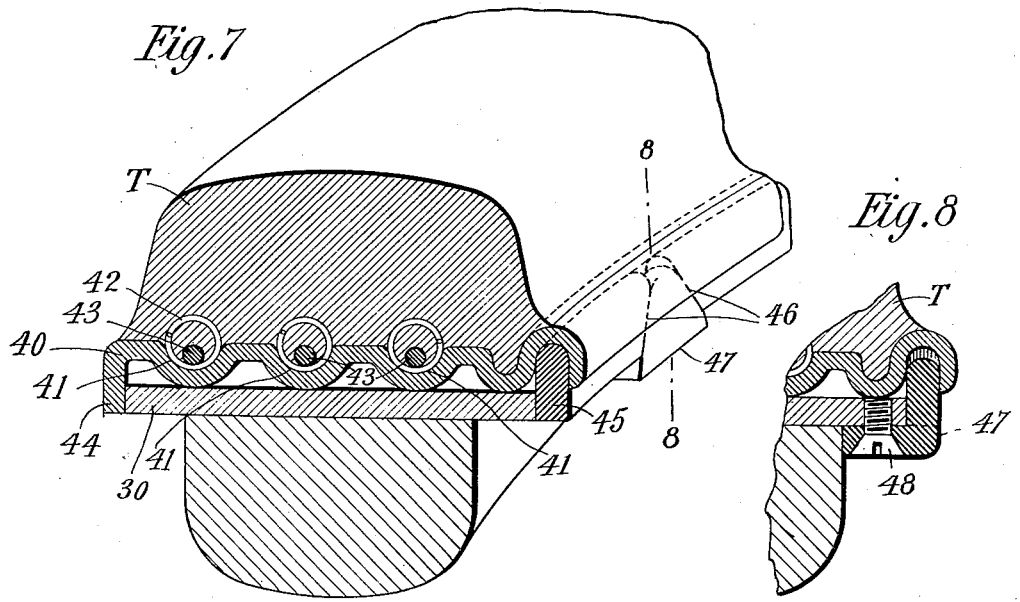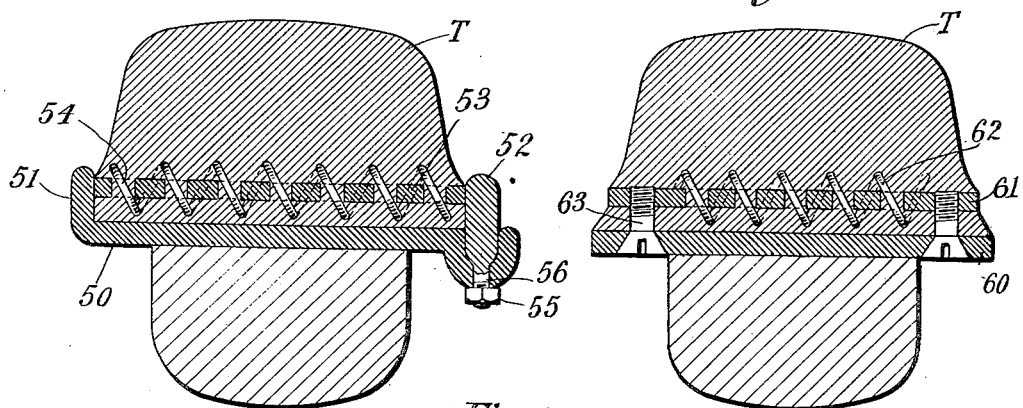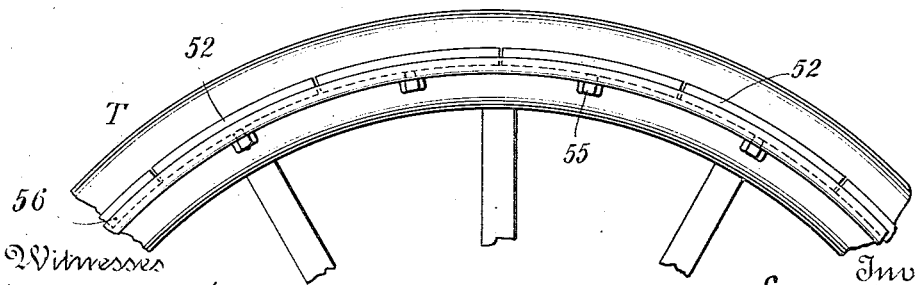

UNITED STATES PATENT OFFICE.

THOMAS MIDGLEY, OF HARTFORD, CONNECTICUT, AND ERNEST HOPKINSON, OF EAST ORANGE, NEW JERSEY.

WHEEL-TIRE.

No. 908,475.   Specification of Letters Patent.   Patented Jan. 5, 1909.

Application filed November 21, 1906. Serial No. 344,382.

*To all whom it may concern:*

Be it known that we, THOMAS MIDGLEY and ERNEST HOPKINSON, citizens of the United States, residing, respectively, in Hartford, Hartford county, Connecticut, and East Orange, Essex county, New Jersey, have invented a new and useful Improvement in Wheel-Tires, of which the following is a specification.

This invention relates to wheel tires and more particularly to solid tires of rubber or other resilient material.

The primary object of the invention is to provide a novel construction of tire and securing devices by means of which the full resiliency of the rubber or other resilient material embodied in the tire may be made available and by means of which the tire will be held on the wheel with perfect security.

A further object of the invention is to provide effective and very inexpensive means for securing a solid tire of rubber or other resilient material upon a wheel.

Other objects and advantages of the invention will appear hereinafter, as the invention is described in connection with the accompanying drawings forming part of this specification; and the scope of the invention will be clearly defined in the appended claims.

Figure 1:
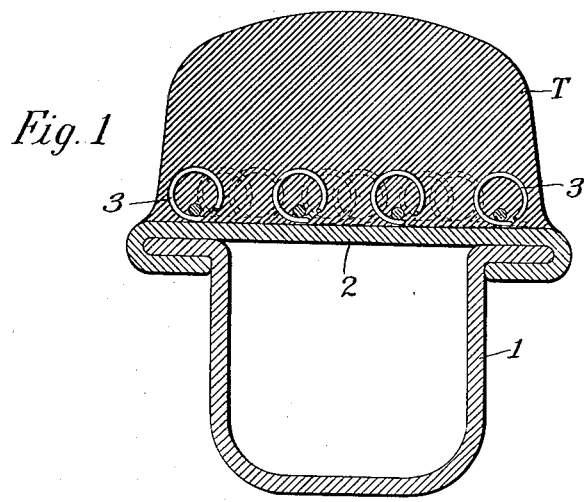
Figure 2:
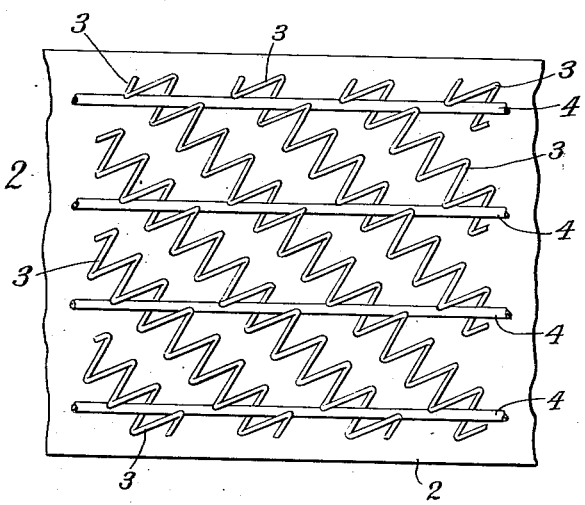
Figure 3:
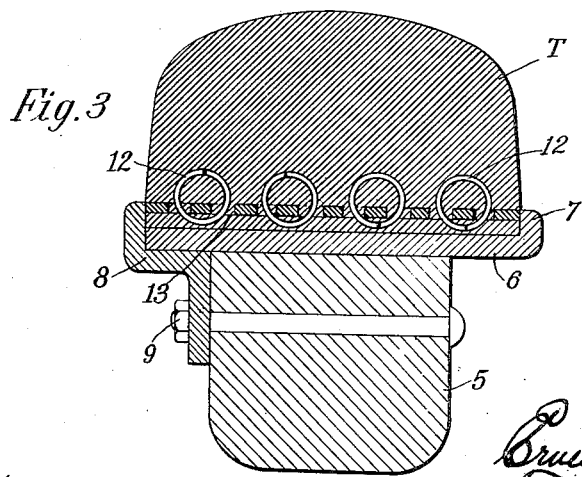

In the drawings: Figure 1 is a transverse sectional view through a wheel felly and tire-securing devices embodying the present invention. Fig. 2 is a plan view of a small section of the wheel felly provided with the tire-securing devices shown in Fig. 1. Fig. 3 is a transverse sectional view through a wheel felly, tire, and securing devices showing a somewhat different embodiment of the invention from that shown in Figs. 1 and 2. Fig. 4 is a view partly in section and partly in perspective showing a felly and tire constituting a third embodiment of the invention. Fig. 5 is a transverse sectional view of a tire and felly showing a fourth embodiment of the invention. Fig. 6 is a transverse sectional view of a tire and felly showing a fifth embodiment of the invention. Fig. 7 is a view partly in transverse section and partly in perspective of a felly and tire showing a sixth embodiment of the invention. Fig. 8 is a fragmentary sectional view on the line 8—8 of Fig. 7. Fig. 9 is a transverse sectional view of a tire and felly showing a seventh embodiment of the invention. Fig. 10 is a fragmentary view in side elevation of a wheel equipped with the tire and rim construction shown in Fig. 9. Fig. 11 is a transverse sectional view of a tire and felly showing an eighth embodiment of the invention.

Referring to the drawings by the reference characters marked thereon, which designate corresponding parts in the several views, 1 designates the wheel felly shown in Fig. 1, which is hollow and preferably formed of metal. This wheel felly is provided with an outer or rim member 2 which is transversely flat and secured on the main member 1 in any suitable manner, as by interlocking flanges, as shown. On the outer, or tire, face of the rim member 2 I secure, preferably by brazing, a plurality of coils 3 of wire, which are preferably laid obliquely across the rim member 1, as shown to best advantage in Fig. 2. Engaging these coils 3 and disposed circumferentially of the wheel are a plurality of turns of wire 4 which may be separate and with the ends connected to form inextensible hoops, or may be successive turns of a single coil of relatively large diameter and small pitch. In either case the ends of the turns 4 will be so secured as to constitute an effective means for binding the coils 3 securely upon the rim member 2. Both the coils 3 and the binding wires 4 which engage the coils are preferably brazed firmly in position upon the rim member 2. To secure the tire T upon the rim member 2 and the wire coils, the wheel is set in the mold for the tire and the rubber or other cushioning material of which the tire is formed is molded directly upon the wheel felly, the rubber or other material penetrating thoroughly all of the reticular structure presented by the coils of wire, which are wholly embedded in the base of the tire.

In Fig. 3 an ordinary wooden felly is illustrated and on the outer or tire face of the felly is shrunk a band 6 having an outwardly disposed marginal flange 7 or series of lugs at one edge, as clearly shown in Fig. 3. This band 6 constitutes the main member of the wheel rim, and it affords a seat for the tire T, which is held thereon by a series of suitable lugs secured by transverse bolts 9 or by a ring of the same cross-section as the lugs and secured in place by similar transverse bolts. In this form of the invention the tire is molded on a base consisting of an endless band 10 with a plurality of coils 12 of wire laced through apertures 13 in the endless band 10. The rubber or other resilient material of which the tire is composed permeates both the apertures in the band 10 and the spaces between the whirls of the wire coils 12. In order to effect proper engagement of the rubber of the tire with the base band and the coils, the base band with the coils secured thereon is introduced into the mold and the rubber of the tire is forced through the openings in the base band and into the spaces between the turns of wire during the process of molding and vulcanizing.

In Fig. 4 the wheel felly structure comprises the main felly member 15, the main rim member 16, and a supplemental rim member 17. The two rim members are securely held upon the main felly member in any suitable manner and the main rim member 16 is transversely flat, as shown. The supplemental rim member is preferably rolled to present a pair of outwardly projecting ridges 18, having between them a dovetail groove. The ridges are characterized by a series of apertures 19 arranged at intervals in each and transversely disposed coils of wire are laced through the apertures, as shown. The supplemental rim member and the transverse coils coöperate to form the reticular structure upon which the tire is formed and by which it is secured in position upon the wheel.

In order to secure the tire upon the felly structure illustrated in Fig. 4, the wheel is introduced into the tire mold, as with the structure illustrated in Fig. 1, and the rubber is forced through the apertures 19 and into the groove or channel during the process of molding and vulcanizing. In this way the outer or auxiliary rim member becomes practically embedded in the base of the tire and forms very effective means for holding the tire in position upon the wheel.

In Fig. 5 we have illustrated in cross-section a portion of a wheel structure having a hollow felly presenting a main member 21, an inner rim member 22, and an outer rim member 23. The main felly member 21 is pierced to admit the outer end of each spoke 24, which is of tubular construction, as shown, and is secured at its outer end by means of the thimble 25 extending into the outer end of the spoke and riveted securely to the two rim members. The exact mode of securing the felly member to the two rim members is immaterial, but that illustrated in Fig. 5 is a convenient and effective arrangement which has given very satisfactory results. The outer rim member 23 is circumferentially channeled to receive a plurality of wire coils 26, which may be connected or be entirely separate, as desired. The wire coils 26 are secured in place by means of binder wires 27 engaging the coils 26 and holding them tightly in the grooves or channels prepared for them in the outer rim member 23. The wires are preferably secured by brazing, this being the method by which the various parts of the wheel proper are united, but the coils 26 will be held with perfect security, if the binder wires 27 are made sufficiently tight, even if brazing is not resorted to as a means for securing the wires on the wheel rim.

As in the other form of the invention already described, the tire shown in Fig. 5 is secured on the wheel rim by being directly molded and vulcanized thereon. Rubber in this, as in the other forms of the invention, penetrates entirely through the reticular structure presented by coils and binder and wires and is held with perfect security thereby.

The embodiments of the invention illustrated in Figs. 6 to 10 inclusive are of the same general type as that illustrated in Fig. 3, the tire-securing devices being of such construction that the tire may be removed from the rim.

As illustrated in Fig. 6, the main rim member 30 is a plain band of metal which will be ordinarily somewhat wider than the felly 31 upon which it is secured by shrinking or otherwise. The tire T is molded on a base band 32 bearing a plurality of circumferentially arranged coils or helices 33 of wire threaded through apertures formed therefor in the base band. At one margin the base band 32 is provided with a lip or flange 34 which extends inwardly toward the center of the wheel and is of suitable width to engage one edge of the main rim member 30 to prevent lateral movement of the tire in one direction upon the main rim member. At the opposite margin the base band 32 is provided with a series of threaded apertures to receive securing screws 35 which are firmly seated on the base band and are provided with extensions 36 which engage the edge of the main rim member 30 and coöperate with the flange 34 at the opposite edge of the base band to hold the tire securely on the rim. In applying a tire of the structure shown in Fig. 6 to the wheel rim, the tire with the embedded base band and helices carried thereby is forced laterally over the rim by pressure until the flange or lip 34 at one margin of the base band contacts with the band 30 forming the rim. The securing screws 35 are then introduced into the apertures provided therefor in the base band 32 and the tire is securely held in position until the retention screws are removed, when lateral pressure in the direction opposite to that employed to force the tire on the rim may be used to remove the tire from the rim.

The tire structure shown in Figs. 7 and 8, like that illustrated in Fig. 6, is designed for application to a wheel rim consisting of a plain band 30 shrunk or otherwise suitably secured to the felly. The tire T is molded upon a base band 40 which is not provided with perforations but has a plurality of circumferential grooves 41 formed therein to receive circumferentially disposed helices 42 of wire. These helices are secured in position by means of binding wires 43 extending circumferentially of the base band, and they may be also secured by brazing. At one edge the base band 40 is provided with an inwardly disposed lip or flange 44 for engagement with one edge of the rim 30 of the wheel and at the other margin the base band 40 is provided on its wheel face with a channel for the reception of a locking ring 45. The channel to receive the locking ring is formed by curving the base band outwardly and then inwardly, but not carrying the inwardly curved edge inward beyond the portions designed to rest upon the wheel rim. In applying the tire shown in Figs. 7 and 8 to the wheel rim the tire is slipped laterally over the wheel rim until the flange or lip 44 engages the edge of the rim member 30. Then the locking ring 45, which is divided and has the ends oppositely beveled, as shown at 46, is sprung into the channel provided in the base band to receive it. The locking ring is then secured by means of a wedge 47 which is introduced between the oppositely beveled ends and secured by means of a screw 48 inserted through a lateral extension from the wedge and engaging the threaded aperture in the rim member 30.

The tire and rim construction illustrated in Figs. 9 and 10 is in some respects the converse of that illustrated in Figs. 7 and 8. The rim 50, which is ordinarily shrunk on the felly, is provided at one margin with an outwardly projecting flange or lip 51 and at the other margin is provided with a groove or channel in the tire face to receive tire-retaining members 52. The tire T is provided with a base band 53 which carries a plurality of transversely disposed helices 54 laced through apertures formed therefor in the base band. The tire in this construction is forced laterally on to the rim 50 until the base band 54 lodges against the rim flange, then the tire-retaining members 52 are secured in place by means of nuts 55 threaded on to lugs 56 provided on the tire-retaining members and extending through apertures formed therefor in the bottom of the channel or groove of the rim. The tire-retaining members 52 are preferably sections of a ring, as shown in Fig. 10, but they may be varied in number and dimensions and be placed in close proximity to each other, so as to form a substantially uninterrupted rim, or widely separated, if desired.

In the tire and rim structure shown in Fig. 11, the rim 60 is a plain band and the tire T has a transversely flat base band 61 provided with transversely arranged helices 62 laced through apertures formed therefor in the base band. The tire is applied to the rim by lateral pressure from either side, and when properly positioned on the rim is secured by means of screws 63 extending through apertures formed in the rim 60 and engaging threaded openings in the base band of the tire.

In all of the several embodiments of the invention above described and illustrated in the accompanying drawings, the resiliency of practically all of the resilient material is available for cushioning purposes. Furthermore, in each of the several forms of the invention above described the tire is molded upon a reticular structure which thereby becomes embedded in the base of the tire and may be regarded as a part thereof. In three forms of the invention, the reticular structure embedded in the base of the tire is permanently associated with the wheel felly, such permanent association being especially desirable in metallic wheels, in which the rigidity of the wheel structure and the security with which the tire is held on the wheel are considerably increased by this feature of construction. In the other forms of the invention, however, no substantial advantage would result from permanent connection of the band at the tire base with the wheel felly, and inexpensive devices for detachably securing the tire in position upon the wheel are accordingly shown.

Having thus described our invention, what we claim as new and desire to secure by Letters Patent is:

1. A wheel tire having a base which is substantially flat transversely and comprising a body of resilient material and a reticular structure at the base of the tire forming an anchorage for the resilient material and including a plurality of helical coils of wire lying substantially parallel to each other embedded in the resilient material and means for rigidly securing said helices upon a wheel.

2. A wheel tire having a base substantially flat transversely and comprising a body of resilient material, a reticular structure at the base of the tire forming an anchorage for said resilient material, said reticular structure including a metallic band extending circumferentially and transversely of the tire and a plurality of wire helices rigidly secured upon said band.

3. In a wheel tire having a base which is substantially flat transversely, the combination with a body of resilient material of a reticular structure at the base of the tire forming an anchorage for said resilient material and comprising a band extending circumferentially and transversely of the tire and a plurality of wire helices rigidly secured to the band and embedded in the resilient material, which is laterally unconfined beyond the outer face of the band.

4. A wheel tire comprising a body of resilient material and an anchorage for said resilient material at the base of the tire, said anchorage including a metallic band extending circumferentially of the tire and openings therein and a plurality of wire helices threaded through the openings in said band.

5. In a wheel tire, the combination with a body of resilient material, of an anchorage for said resilient material at the base of the tire comprising a metallic band extending circumferentially and transversely of the wheel and a plurality of wire helices secured to said band and embedded in the resilient material, and devices engaging said band adjacent to the margins for securing it in position upon the wheel.

6. In a wheel tire, the combination with a body of resilient material, of an anchorage for said resilient material comprising a base band upon which said resilient material is carried, said base band having an inwardly turned flange at one margin extending inwardly beyond the base of the tire, a rim member upon which said tire is removably seated with the flange of said base band in engagement with one margin thereof, and a plurality of screws in threaded engagement with said base band near one margin and extending inwardly so as to engage the margin of the rim member and secure the tire in engagement thereon.

In testimony whereof, we have signed our names in the presence of two witnesses.

THOMAS MIDGLEY.
ERNEST HOPKINSON.

Witnesses:
H. RICHARD WOBSE.
BAXTER MORTON.